United States Patent
Persson et al.

(10) Patent No.: US 12,139,195 B2
(45) Date of Patent: Nov. 12, 2024

(54) METHOD FOR REVERSING AN ARTICULATED VEHICLE COMBINATION

(71) Applicant: Volvo Truck Corporation, Gothenburg (SE)

(72) Inventors: Daniel Persson, Gothenburg (SE); Agneta Sjögren, Hovås (SE)

(73) Assignee: Volvo Truck Corporation, Gothenburg (SE)

( * ) Notice: Subject to any disclaimer, the term of this patent is extended or adjusted under 35 U.S.C. 154(b) by 286 days.

(21) Appl. No.: 17/909,111

(22) PCT Filed: Mar. 12, 2020

(86) PCT No.: PCT/EP2020/056674
§ 371 (c)(1),
(2) Date: Sep. 2, 2022

(87) PCT Pub. No.: WO2021/180326
PCT Pub. Date: Sep. 16, 2021

(65) Prior Publication Data
US 2023/0096655 A1    Mar. 30, 2023

(51) Int. Cl.
*B62D 15/00* (2006.01)
*B62D 15/02* (2006.01)
(Continued)

(52) U.S. Cl.
CPC ....... *B62D 15/025* (2013.01); *B62D 15/0265* (2013.01); *G06T 7/13* (2017.01);
(Continued)

(58) Field of Classification Search
CPC .............. B62D 15/025; B62D 15/0265; B62D 15/0285; G06T 7/73; G06T 7/13;
(Continued)

(56) References Cited

U.S. PATENT DOCUMENTS

| | | | |
|---|---|---|---|
| 10,464,555 B2 | 11/2019 | Heimberger et al. | |
| 2020/0180691 A1* | 6/2020 | Sandblom | B62D 15/0285 |

FOREIGN PATENT DOCUMENTS

| | | |
|---|---|---|
| DE | 102005045196 A1 | 9/2006 |
| EP | 3344519 A1 | 7/2018 |

OTHER PUBLICATIONS

Rasmussen, C., "Combining Laser Range, Color, and Texture Cues for Autonomous Road Following," Proceedings of the 2002 IEEE International Conference on Robotics and Automation (Cat. No. 02CH37292), May 11-15, 2002, Washington, DC, USA, IEEE, 6 pages.

(Continued)

*Primary Examiner* — Jacob M Amick
(74) *Attorney, Agent, or Firm* — Withrow & Terranova, PLLC

(57) ABSTRACT

The disclosure relates to a method for reversing an articulated vehicle combination along a road curvature of a road, comprising obtaining image data representing a rearward view with respect to the articulated vehicle combination, wherein the method further comprises detecting road edges of the road in the image data; determining a plurality of longitudinal and lateral positions of the respective detected road edges; calculating road curvature of the road based on the determined lateral and longitudinal positions; calculating vehicle path curvature to stay on the road; and reversing the articulated vehicle combination by automatically steering the articulated vehicle combination to follow the calculated vehicle path curvature in order to follow the road curvature, wherein the road edges are detected by use of an image analysis algorithm which is based on a plurality of predefined types of road edges of a plurality of different road types.

18 Claims, 5 Drawing Sheets

(51) Int. Cl.
  *G06T 7/13*    (2017.01)
  *G06T 7/73*    (2017.01)
  *G06V 20/56*   (2022.01)
  *G06V 20/58*   (2022.01)

(52) U.S. Cl.
  CPC .............. *G06T 7/73* (2017.01); *G06V 20/588* (2022.01); *G06T 2207/20081* (2013.01); *G06T 2207/20084* (2013.01); *G06T 2207/30256* (2013.01)

(58) Field of Classification Search
  CPC ......... G06T 2207/20081; G06T 2207/200084; G06T 2207/30256; G06V 20/588
  See application file for complete search history.

(56) References Cited

OTHER PUBLICATIONS

Seibert, A. et al., "Camera based detection and classification of soft shoulders, curbs and guardrails," 2013 IEEE Intelligent Vehicles Symposium (IV), Jun. 23-26, 2013, Gold Coast, QLD, Australia, IEEE, 6 pages.
International Search Report and Written Opinion for International Patent Application No. PCT/EP2020/056674, mailed Nov. 25, 2020, 12 pages.
International Preliminary Report on Patentability for International Patent Application No. PCT/EP2020/056674, mailed Jun. 22, 2022, 16 pages.

\* cited by examiner

METHOD FOR REVERSING AN ARTICULATED VEHICLE COMBINATION

This application is a 35 USC 371 national phase filing of International Application No. PCT/EP2020/056674, filed Mar. 12, 2020, the disclosure of which is incorporated herein by reference in its entirety.

TECHNICAL FIELD

The invention relates to a method for reversing an articulated vehicle combination. The invention further relates to a control unit for an articulated vehicle combination and/or to an articulated vehicle combination.

The invention can be applied in heavy-duty vehicles, such as trucks, buses and construction equipment. Although the invention will be described with respect to a heavy-duty articulated vehicle combination, the invention is not restricted to this particular vehicle, but may also be used in other vehicles such as passenger cars, wheel loaders, excavators and backhoe loaders.

BACKGROUND

Driver assistance systems are frequently used in modern vehicles, including trucks, for assisting the driver in performing certain driving manoeuvres. For example, it is well known to use cruise control systems, lane keeping assistance systems which follows painted road lane markers and also driving assistance systems for reversing.

For e.g. trucks, and especially for truck and trailer combinations (articulated vehicle combinations), reversing may be a challenging task for the driver. To this end, it is for example known to support a driver during reversing by use of e.g. rearward facing cameras. The driver can by use of a displayed camera image be supported when reversing and steering the articulated vehicle combination along a travelling path.

As another example, it is also known to provide more advanced systems where the driver does not need to e.g. steer the articulated vehicle combination during reversing. Such systems may make use of GNSS (global navigation satellite system) positioning data as input for reversing the articulated vehicle combination along a travelling path.

However, it has been found that in certain circumstances GNSS positioning data cannot be used since there are areas where there is radio shadow. For example, in terminal areas and/or on forest roads, the articulated vehicle combination may not be able to reliably receive GNSS positioning data.

Therefore, in view of the above, there is a strive to develop more advanced methods for reversing an articulated vehicle combination.

SUMMARY

An object of the invention is to provide an improved method for reversing an articulated vehicle combination along a road curvature of a road, an improved control unit for an articulated vehicle combination and/or an articulated vehicle combination comprising a control unit.

According to a first aspect of the invention, the object is achieved by a method. According to a second aspect of the invention, the object is achieved by a control unit. According to a third aspect, the object is achieved by a articulated vehicle combination.

According to the first aspect, the object is achieved by a method for reversing an articulated vehicle combination along a road curvature of a road. The method comprises:
obtaining image data representing a rearward view with respect to the articulated vehicle combination;
detecting road edges of the road in the image data;
determining a plurality of longitudinal and lateral positions of the respective detected road edges;
calculating road curvature of the road based on the determined lateral and longitudinal positions;
calculating vehicle path curvature to stay on the road; and
reversing the articulated vehicle combination by automatically steering the articulated vehicle combination to follow the calculated vehicle path curvature in order to follow the road curvature, wherein the road edges are detected by use of an image analysis algorithm which is based on a plurality of predefined types of road edges of a plurality of different road types.

By the provision of the method as disclosed herein, improved reversing of the articulated vehicle combination is achieved in that the articulated vehicle combination follows the road curvature of the road without departing from the road, or at least without substantially departing from the road when reversing. More specifically, it has been realized that in certain circumstances conventional reversing assistance systems may not be able to reliably determine and/or obtain information about a road curvature of a road. For example, GNSS positioning data may not be received if a vehicle is located on a forest road or on a road surrounded by tall buildings. Still further, in certain circumstances, it may also be difficult for a rearward projecting perception sensor to efficiently identify road edges of the road behind the articulated vehicle combination. Therefore, by use of the image analysis algorithm as disclosed herein, different types of road edges for different types of roads may be efficiently identified. For example, a forest road may comprise gravel, mud, grass, soil, debris etc., and it may therefore be difficult to identify the road edges of the forest road. As another example, an asphalt road may e.g. be covered by ice, snow and/or debris, and therefore it may also be difficult to identify road edges of such a road. By using an image analysis algorithm which is based on a plurality of predefined types of road edges of a plurality of different road types, the road edges during reversing can be efficiently identified.

Optionally, the image analysis algorithm may be a neural network algorithm. Still optionally, the predefined types of road edges of the plurality of different road types may be obtained by use of a neural network training algorithm, wherein the neural network training algorithm has been trained based on image data of different road types, wherein road edges of the different road types have at least initially been manually annotated. Hence, the neural network training algorithm can by itself learn how to identify road edges, but also it has been found advantageous to manually annotate road edges in order to further improve the road edge detection of the method. For example, road edges of certain roads, such as different forest roads, may be difficult to identify for the neural network training algorithm, in which case it may be beneficial to let a human manually annotate road edges, also after the neural network training algorithm has already started to obtain different types of road edges of a plurality of different road types.

Optionally, the image analysis algorithm may be based on a Hough transform. A Hough transform has been found to be a good alternative to the above mentioned neural network algorithm.

Optionally, the lateral and longitudinal positions may further be determined by use of a distance measurement calibration algorithm for the obtained image data. Still optionally, the distance measurement calibration algorithm may comprise registered pixel locations in an image, wherein the image represents a corresponding view of the rearward view with respect to the articulated vehicle combination, and wherein the pixel locations are associated with corresponding known lateral and longitudinal distances to objects behind the vehicle combination. By using a distance measurement calibration algorithm, more accurate longitudinal and lateral distances to the identified road edges during reversing may be provided. As such, the road curvature following may be further improved, reducing the risk of departing from the road during reversing.

Optionally, the distance measurement calibration algorithm may comprise one or more registered pixel locations of a look ahead point which is located at a predefined distance in a longitudinal direction behind the vehicle combination, wherein the method further comprises:

by use of the obtained image data, determining a value indicative of a lateral displacement of the look ahead point with respect to the calculated road curvature, and wherein reversing the articulated vehicle combination by automatically steering the articulated vehicle combination to follow the calculated vehicle path curvature in order to follow the road curvature is further performed by use of the determined value indicative of the lateral displacement. It has been found advantageous to provide an automatic steering command based on a predefined look ahead point and a value indicative of a lateral displacement of the look ahead point with respect to the calculated road curvature. Hence, the steering command may be provided in response to the value indicative of the lateral displacement of the look ahead point. Further, by use of the above, facilitated calculation procedure for following the road may be provided which requires reduced computational effort. Hence, a more cost efficient method may be provided, requiring less complicated calculation resources. Further, this may also imply faster processing, reducing the risk of e.g. time lags.

Optionally, reversing the vehicle combination by automatically steering the vehicle combination to follow the calculated vehicle path curvature in order to follow the road curvature may be performed by use of a predefined geometric vehicle model for the articulated vehicle combination, wherein the geometric vehicle model is based on how geometric variables associated with the articulated vehicle combination relate to each other when the articulated vehicle combination moves in reverse with respect to a curvature radius, wherein the geometric variables comprises any one of an articulation angle variable (phi_ref) with respect to the curvature radius and a lateral displacement variable (y_lateral) with respect to the curvature radius.

Still optionally, the geometric vehicle model may comprise any one of the following equations:

$$(L2*\cos(phi\_ref)+C)/(\sin(phi\_ref))=PR;$$

$$(L^2+y\_lateral^2)/(2*y\_lateral)=PR;$$

wherein PR is vehicle path curvature radius, L2 is a rear trailer wheel base length of the vehicle combination, C is next-to-last-trailer coupling point distance from the next-to-last-trailer rear axle, phi_ref is the trailer articulation angle corresponding to a lateral displacement of the look ahead point with respect to the road curvature, L is the predefined distance in the longitudinal direction of the look ahead point behind the vehicle combination and y_lateral is the lateral displacement of the look ahead point with respect to the road curvature.

A wheel base length as used herein may be any one of an actual wheel base length and an effective wheel base length. Wheel base length and effective wheel base length is well known by the skilled person. However, an effective wheel base length may be defined as a length between a pivot point and wheels of a vehicle body, e.g. a trailer. An effective pivot point may for example be located between two, or three, adjacent wheel axles of the vehicle body, such as between two adjacent rear axles of a trailer.

Optionally, the plurality of different road types may comprise at least one of gravel roads, forest roads, dirt roads, terminal roads with printed lanes or other road markers, or the like.

Optionally, reversing the articulated vehicle combination by automatically steering the articulated vehicle combination to follow the calculated vehicle path curvature in order to follow the road curvature may be performed by further obtaining a current articulation angle value indicative of a current articulation angle of the vehicle combination, and controlling the steering of the articulated vehicle combination in response to the current articulation angle value. The current articulation angle of the vehicle combination may be defined as an articulation angle between the two last connected vehicle bodies of the articulated vehicle combination, such as between a towing truck and its trailer. Further, and still optionally, vehicle articulation angles positioned in front of the last vehicle articulation angle may be involved for steering the last measured articulation angle to agree with phi_ref.

According to the second aspect, the object is achieved by a control unit for an articulated vehicle combination comprising at least one perception sensor for obtaining image data representing a rearward view of a road, the control unit being configured to:

obtain image data from the at least one perception sensor representing a rearward view with respect to the articulated vehicle combination;

detect road edges of the road in the image data;

determine a plurality of longitudinal and lateral positions of the respective detected road edges;

calculate road curvature of the road based on the determined lateral and longitudinal positions;

calculate vehicle path curvature to stay on the road; and provide a steering command during reversing of the articulated vehicle combination to follow the calculated vehicle path curvature in order to follow the road curvature, wherein the road edges are detected by use of an image analysis algorithm which is based on a plurality of predefined types of road edges of a plurality of different road types.

Advantages and effects of the second aspect of the invention are largely analogous to the advantages and effects of the first aspect of the invention. It shall also be noted that all embodiments of the first aspect of the invention are applicable to all embodiments of the second aspect of the invention and vice versa.

The control unit may include a microprocessor, microcontroller, programmable digital signal processor or another programmable device. The primary control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may comprise embedded hardware, sometimes with integrated software, where the hardware show close physical relationship. Examples of physical relationships are: shared casing and components mounted on one or several circuit boards. It shall also be noted that the control unit may be a combination of several communicatively connected control units.

Optionally, the image analysis algorithm may be a neural network algorithm.

Optionally, the predefined types of road edges of the plurality of different road types may be obtained by use of a neural network training algorithm, wherein the neural network training algorithm has been trained based on image data of different road types, wherein road edges of the different road types have at least initially been manually annotated.

Optionally, the image analysis algorithm may be based on a Hough transform.

Optionally, the lateral and longitudinal positions may further be determined by use of a distance measurement calibration algorithm for the obtained image data.

Optionally, the distance measurement calibration algorithm may comprise registered pixel locations in an image, wherein the image represents a corresponding view of the rearward view with respect to the articulated vehicle combination, and wherein the pixel locations are associated with corresponding known lateral and longitudinal distances to objects behind the vehicle combination.

Optionally, the distance measurement calibration algorithm may comprise one or more registered pixel locations of a look ahead point which is located at a predefined distance in a longitudinal direction behind the vehicle combination, wherein the control unit may further be configured to:
  by use of the obtained image data, determine a value indicative of a lateral displacement of the look ahead point with respect to the calculated road curvature, and wherein the steering command to follow the vehicle path curvature in order to follow the calculated road curvature is based on the determined value indicative of the lateral displacement.

Optionally, the steering command to follow the vehicle path curvature in order to follow the calculated road curvature may be based on a predefined geometric vehicle model for the articulated vehicle combination, wherein the geometric vehicle model is based on how geometric variables associated with the articulated vehicle combination relate to each other when the articulated vehicle combination moves in reverse with respect to a curvature radius, wherein the geometric variables comprises any one of an articulation angle variable with respect to the curvature radius and a lateral displacement variable with respect to the curvature radius.

Optionally, the geometric vehicle model may comprise any one of the following equations:

$$(L2 * \cos(phi\_ref) + C) / (\sin(phi\_ref)) = PR;$$

$$(L^2 + y\_lateral^2) / (2 * y\_lateral) = PR;$$

wherein PR is vehicle path curvature radius, L2 is a rear trailer wheel base length of the vehicle combination, C is next-to-last-trailer coupling point distance from the next-to-last-trailer rear axle, phi_ref is the trailer articulation angle corresponding to a lateral displacement of the look ahead point with respect to the road curvature, L is the predefined distance in the longitudinal direction of the look ahead point behind the vehicle combination and y_lateral is the lateral displacement of the look ahead point with respect to the road curvature.

Optionally, the provided steering command during reversing of the articulated vehicle combination may be based on that the control unit is further configured to obtain a current articulation angle value indicative of a current articulation angle of the vehicle combination, wherein the articulated vehicle combination is steered in response to the current articulation angle value.

According to the third aspect, the object is achieved by an articulated vehicle combination comprising at least one perception sensor for obtaining image data representing a rearward view with respect to the articulated vehicle combination and a control unit according to any one of the embodiments of the second aspect of the invention.

Advantages and effects of the third aspect of the invention are largely analogous to the advantages and effects of the first and second aspects of the invention. It shall also be noted that all embodiments of the first and second aspects of the invention are applicable to all embodiments of the third aspect of the invention and vice versa.

Optionally, the articulated vehicle combination may further comprise a sensor for obtaining a current articulation angle value indicative of an articulation angle of the vehicle.

According to a fourth aspect, the object is achieved by a computer program comprising program code means for performing the steps of any of the embodiments of the first aspect, when said program is run on a computer. The computer program is preferably run on the control unit according to the second aspect of the invention.

Advantages and effects of the fourth aspect of the invention are largely analogous to the advantages and effects of the first, second and third aspects of the invention. It shall also be noted that all embodiments of the first, second and third aspects of the invention are applicable to all embodiments of the fourth aspect of the invention and vice versa.

According to a fifth aspect, the object is achieved by a computer readable medium carrying a computer program comprising program code means for performing the steps of any of the embodiments of the first aspect, when said program product is run on a computer. The computer program is preferably run on the control unit according to the second aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
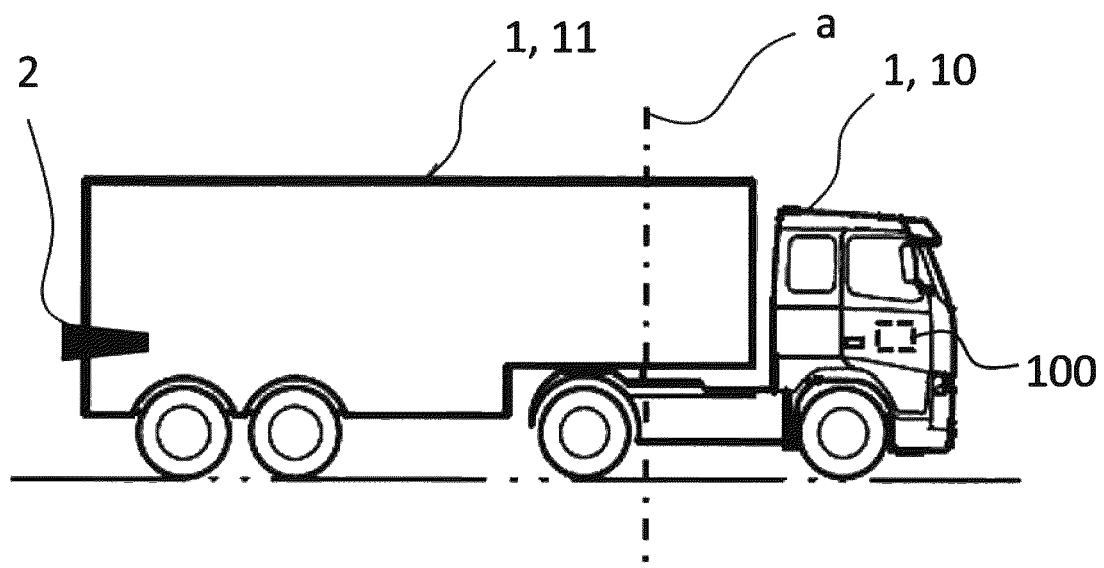
FIG. 1 is a side view of a vehicle according to an example embodiment of the present invention.

In FIG. 1, a side view of a vehicle 1 in the form of a heavy-duty truck 10 and trailer 11 combination is shown. Hence, FIG. 1 shows an example of an articulated vehicle combination 1, and comprises two connected vehicle bodies 10, 11 which are arranged to be articulated with respect to each other. In the shown embodiment, the two vehicle bodies 10, 11 are arranged to be articulated with respect to each other about an articulation axis a. The articulation axis a is provided vertically, as seen when the articulated vehicle combination 1 is provided on a flat horizontally extending surface.

It shall be noted that even though a truck 10 and trailer 11 combination is shown, the present invention is not limited to only this type of vehicle, but may also be used for other articulated vehicle combinations, such as other types of trucks, buses and construction equipment having at least one articulation joint. An articulated vehicle combination as used herein may be defined as a vehicle comprising at least two connected vehicle bodies which can be articulated with respect to each other about an articulation joint. Further, the present invention may also be advantageously implemented for vehicles comprising more than one articulation joint, such as for a heavy-duty truck and trailer combinations known as a Nordic combination. A Nordic combination comprises a truck connected to at least one trailer via a dolly. Hence, the Nordic combination comprises at least two articulation joints. A vehicle having more than one articulation joint may be difficult to reverse manually in certain circumstances, such as in narrow areas, including but not limited to forest roads, terminal areas etc. Therefore, by the provision of the method as disclosed herein, improved reversing in such situations can be provided.

Figure 2:
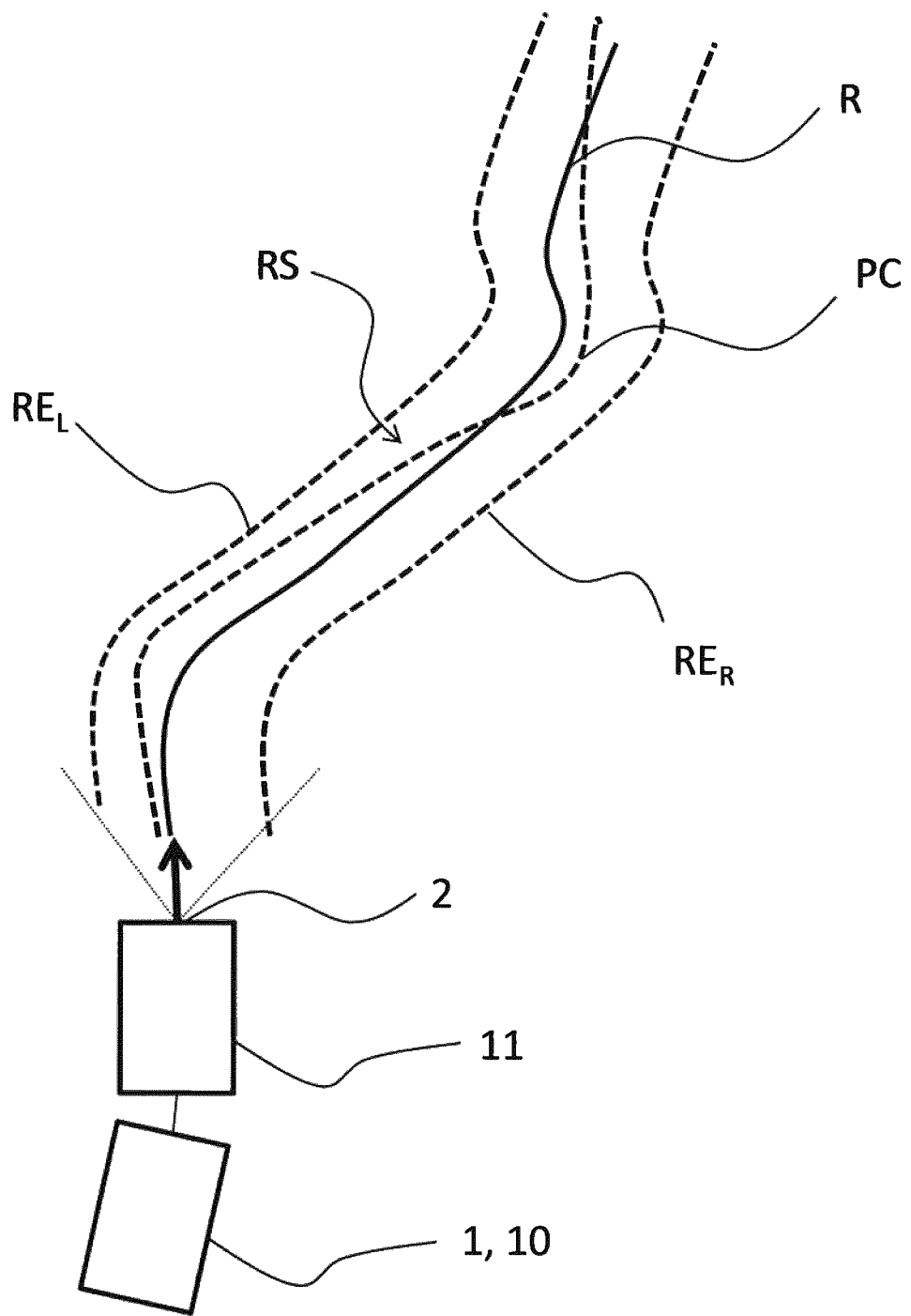
FIG. 2 is a schematic two-dimensional top-view of a vehicle combination which is about to reverse along a road.
Figure 3:
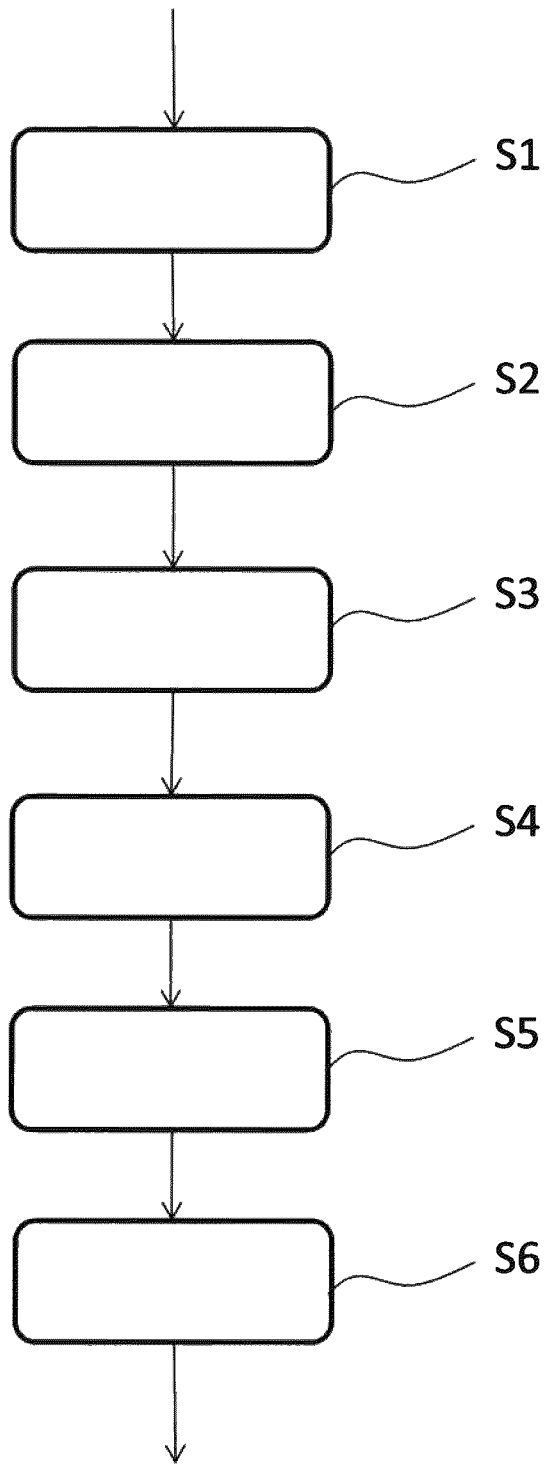
FIG. 3 is a flowchart of a method according to an example of the present invention.

With respect to e.g. FIGS. 1 to 3, a method according to an example embodiment of the present invention will be described. FIG. 2 shows a schematic view from above when an articulated vehicle combination 1 is reversing along a road curvature R of a road RS. The articulated vehicle combination 1 may for example be the articulated vehicle combination as shown in FIG. 1. The articulated vehicle combination 1 comprises a perception sensor 2 for obtaining image data representing a rearward view of the road RS.

Optionally, the perception sensor 2 may be a LIDAR (light detection and ranging), a RADAR (radio detection and ranging), a SONAR (sound navigation ranging), and/or a camera. Preferably the perception sensor 2 is a camera. The perception sensor 2 is mounted so that a rearward view of the road RS can be obtained. In FIGS. 1 and 2, a camera 2 is mounted at the rear end of the trailer 11.

The method comprises:
S1: obtaining image data representing a rearward view with respect to the articulated vehicle combination 1;
S2: detecting road edges $RE_L$, $RE_R$ of the road RS in the image data;
S3: determining a plurality of longitudinal and lateral positions of the respective detected road edges $RE_L$, $RE_R$. As shown in FIG. 2, the road edges' $RE_L$, $RE_R$ longitudinal and lateral positions may be determined with respect to a two-dimensional plane, which may be substantially parallel with the road's surface, even though they may also be determined in a three-dimensional space (not shown). Implementing the method as disclosed herein by use of a two-dimensional plane has shown to facilitate the required calculations, and may thereby require less computational effort. Further, applying a two-dimensional approximation has shown to suffice for efficiently reversing the articulated vehicle combination 1.

The method further comprises:
S4: calculating road curvature R of the road RS based on the determined lateral and longitudinal positions. In the example shown in FIG. 2, the road curvature R has been set to the road curvature R located half-way in-between each road edge $RE_L$, $RE_R$. It shall however be understood that the road curvature R may be set to any road curvature indicative of the pathway of the road RS. For example, in certain circumstances, the road curvature R may be biased towards any one of the respective road edges $RE_L$, $RE_R$.

The method further comprises:
S5: calculating vehicle path curvature PC to stay on the road RS; and
S6: reversing the articulated vehicle combination 1 by automatically steering the articulated vehicle combination 1 to follow the calculated vehicle path curvature PC in order to follow the road curvature R, wherein the road edges $RE_L$, $RE_R$ are detected by use of an image analysis algorithm which is based on a plurality of predefined types of road edges of a plurality of different road types.

The image analysis algorithm is preferably a neural network algorithm, and wherein the predefined types of road edges of the plurality of different road types may be obtained by use of a neural network training algorithm. The neural network training algorithm is preferably trained based on image data of different road types, wherein road edges of the different road types have at least initially been manually annotated. Thereby, more types of road edges which otherwise would be difficult to recognize by a computer can be detected by the image analysis algorithm. This has shown to be especially advantageous when no GNSS positioning data can be received by the articulated vehicle combination. As mentioned in the above, such a situation may e.g. occur when the articulated vehicle combination is driving on a forest road or the like where satellite data cannot be reliably received.

Figure 5:
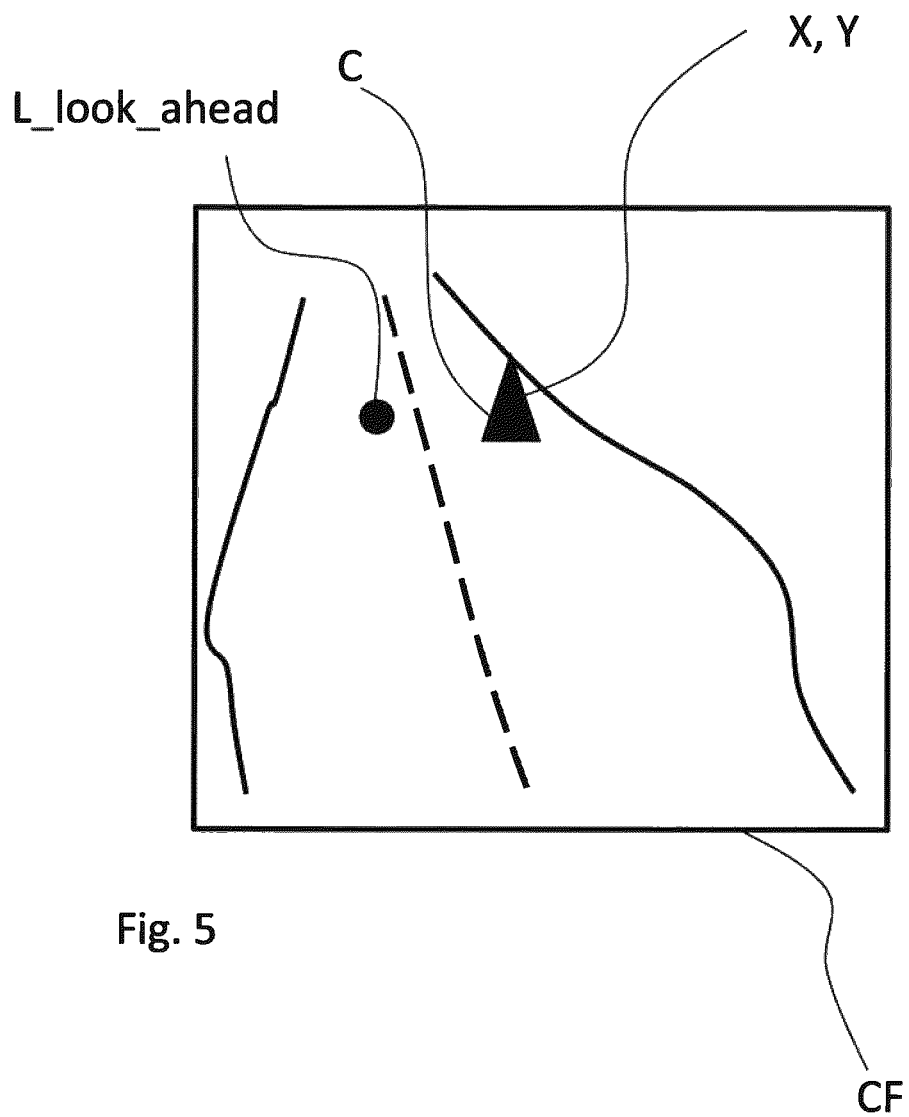
FIG. 5 schematically shows a camera image of a perception sensor for providing a distance measurement calibration algorithm according to an example embodiment of the present invention.

The lateral and longitudinal positions may further be determined by use of a distance measurement calibration algorithm for the obtained image data. An example of how to obtain the distance measurement calibration algorithm is shown in FIG. 5. FIG. 5 shows a camera image CF from a perception sensor 2 in the form of a camera which is mounted at the rear end of the articulated vehicle combination 1. The image CF here shows a road behind the articulated vehicle combination 1. The calibration may be performed at any location. However, it is preferred if the calibration is done at a substantially flat horizontally extending surface, for later on being used at a flat horizontally extending surface. Likewise, the calibration may additionally or as an alternative be done for other inclinations, where a specific inclination calibration later on is used for the same inclination situation. According to an example embodiment, the calibration may also be performed in a virtual environment.

The camera 2 is mounted at a predetermined location at the rear end, i.e. at a specific height and at a specific transverse location of the vehicle 1. The distance measurement calibration algorithm comprises registered pixel locations X, Y in the image CF, wherein the image CF represents a corresponding view of the rearward view with respect to the articulated vehicle combination 1, and wherein the pixel locations X, Y are associated with corresponding known lateral and longitudinal distances to objects C behind the articulated vehicle combination 1. The object C is in FIG. 5 a cone which is placed at a specific known lateral and longitudinal distance from the articulated vehicle combination 1. By e.g. moving the cone 5 so that it appears in all different pixel locations in the image CF, a relation between specific pixel locations in the image CF and real lateral and longitudinal distances with respect to the articulated vehicle combination 1 can be determined.

As further shown in FIG. 5, the distance measurement calibration algorithm comprises one or more registered pixel locations of a look ahead point L_look_ahead which is located at a predefined distance L in a longitudinal direction behind the vehicle combination.

In this respect, the method may further comprise:
by use of the obtained image data, determining a value indicative of a lateral displacement y_lateral of the look ahead point L_look_ahead with respect to the calculated road curvature R, and wherein reversing the articulated vehicle combination by automatically steering the articulated vehicle combination to follow the calculated vehicle path curvature PC in order to follow the road curvature R is further performed by use of the determined value indicative of the lateral displacement. An example of this step will be further described with respect to FIG. 4.

More particularly, reversing the vehicle combination by automatically steering the vehicle combination to follow the calculated vehicle path curvature PC in order to follow the road curvature R may be performed by use of a predefined geometric vehicle model for the articulated vehicle combination 1. The geometric vehicle model is based on how geometric variables associated with the articulated vehicle combination 1 relate to each other when the articulated vehicle combination 1 moves in reverse with respect to a curvature radius. The geometric variables comprise any one of an articulation angle variable phi_ref with respect to the curvature radius and a lateral displacement variable y_lateral with respect to the curvature radius.

The geometric vehicle model may comprise any one of the following equations:

$$(L2*cos(phi\_ref)+C)/(sin(phi\_ref))=PR;$$

$$(L^2+y\_lateral^2)/(2*y\_lateral)=PR;$$

wherein PR is vehicle path curvature radius, L2 is a rear trailer wheel base length of the vehicle combination, C is next-to-last-trailer coupling point distance from the next-to-last-trailer rear axle, phi_ref is the trailer articulation angle corresponding to a lateral displacement of the look ahead point with respect to the road curvature R, L is the predefined distance in the longitudinal direction of the look ahead point L_look_ahead behind the vehicle combination and y_lateral is the lateral displacement of the look ahead point with respect to the road curvature R.

Figure 4:
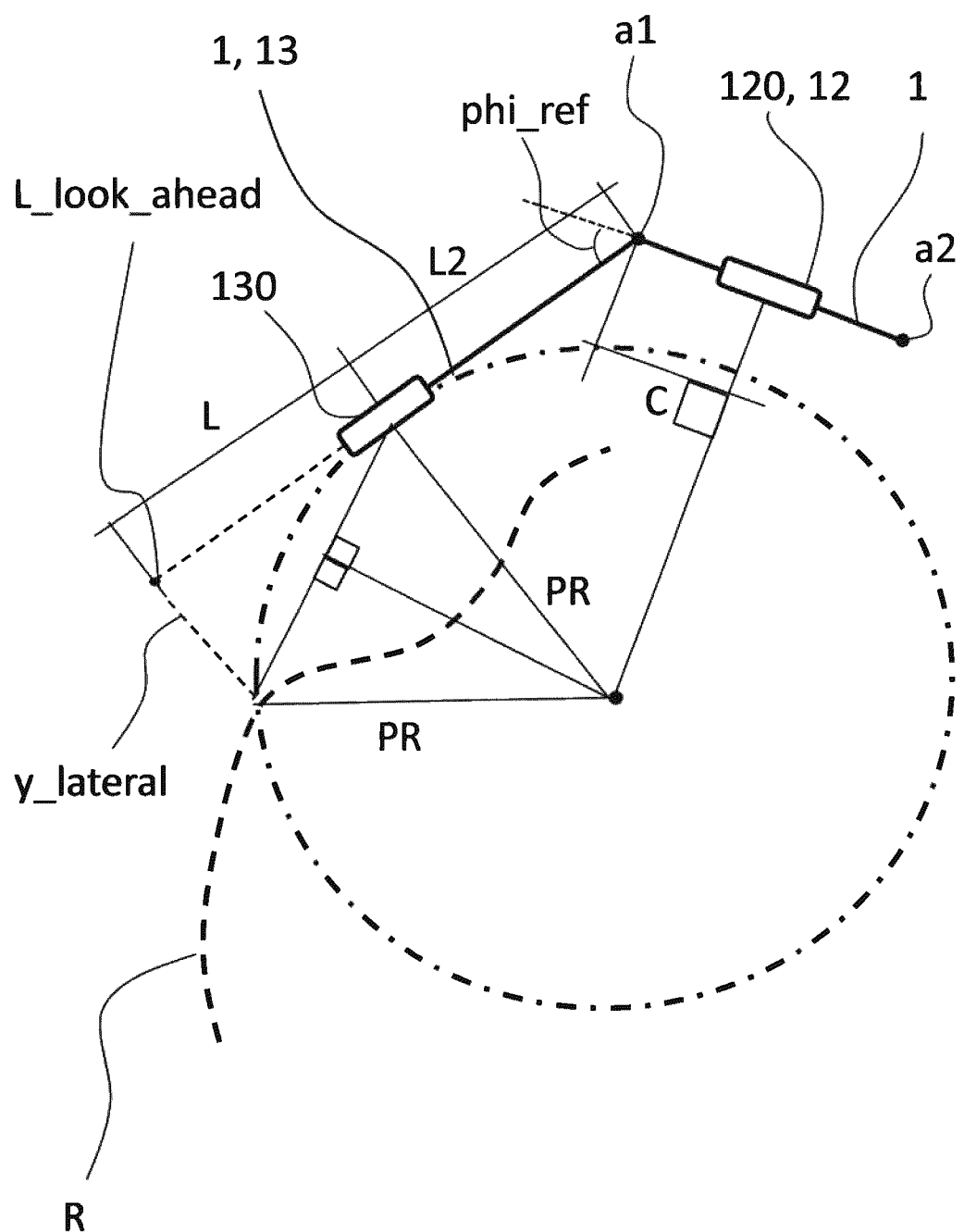
FIG. 4 is a schematic two-dimensional top-view of a vehicle combination which is about to reverse along a road by use of a predefined geometric vehicle model according to an example embodiment of the present invention.

FIG. 4 shows a simplified two-dimensional schematic view seen from above of an articulated vehicle combination 1. The vehicle combination comprises a vehicle body 12 and a vehicle body 13 which are connected via an articulation joint a1. The vehicle body 13 is the last trailer of the articulated vehicle combination 1. The reference 130 represents a rear wheel at a rear axle of the vehicle body 13. The reference 120 represents a wheel of a next-to-last-trailer rear axle. The vehicle body 12 may be connected to another vehicle body, such as to a truck (not shown), via another articulation joint a2. For example, the vehicle body 12 may be a dolly wagon of a Nordic combination, as mentioned in the above. The vehicle body 13 may for example be a semi-trailer. The geometric vehicle model is used with a desired travelling direction of the rear axle comprising the wheel 130 that follows a tangential direction of a circle based on the vehicle path curvature radius PR.

In the embodiment shown in FIG. 4, the length L2 is the wheel base length between the articulation joint a1 and the rear wheel axle comprising the wheel 130. The length C is next-to-last-trailer coupling point a1 distance from the next-to-last-trailer rear axle comprising the wheel 120. It shall be noted that the vehicle model is not limited to only this type of articulated vehicle combination, but may be advantageously used for any type of articulated vehicle combination.

By use of the above mentioned vehicle model, the articulated vehicle combination 1 can be reversed by automatically steering the articulated vehicle combination 1 to follow the calculated vehicle path curvature PC in order to follow the road curvature R.

Furthermore, reversing the articulated vehicle combination 1 by automatically steering the articulated vehicle combination 1 to follow the calculated vehicle path curvature PC in order to follow the road curvature R is performed by further obtaining a current articulation angle value indicative of a current articulation angle of the vehicle combination 1, and controlling the steering of the articulated vehicle combination 1 in response to the current articulation angle value. The current articulation angle may for example be measured by a sensor (not shown) at the articulation axis a in FIG. 1 or at the articulation joint a1 in FIG. 4. For example, a control loop may be provided where phi_ref and the current articulation angle value is provided as input to the control loop for adjusting the articulation angle between the connected vehicle bodies 12, 13 (FIG. 4) or 10, 11 (FIG. 1).

As mentioned in the above, the method is preferably implemented in a control unit 100 as e.g. shown in FIG. 1. The control unit 100 is configured to perform the method as disclosed herein and to provide a steering command during reversing of the articulated vehicle combination 1 to follow the calculated vehicle path curvature PC in order to follow the road curvature R, wherein the road edges $RE_L$, $RE_R$ are detected by use of the image analysis algorithm which is based on a plurality of predefined types of road edges of a plurality of different road types. The steering command is preferably provided by issuing a signal to a steering system (not shown) of the truck 10. The steering system preferably comprises one or more actuators for steering e.g. front wheels of the truck 10.

In another embodiment, the control unit 100 may also be configured to provide propulsion and/or braking commands during reversing. In other words, a fully automatic reversing operation may be provided by use of the control unit 100.

Further, the provided steering command during reversing of the articulated vehicle combination 1 may also be based on that the control unit 100 is further configured to obtain a current articulation angle value indicative of a current articulation angle of the vehicle combination, wherein the articulated vehicle combination 1 is steered in response to the current articulation angle value.

It is to be understood that the present invention is not limited to the embodiments described above and illustrated in the drawings; rather, the skilled person will recognize that many changes and modifications may be made within the scope of the appended claims.

The invention claimed is:

1. A method for reversing an articulated vehicle combination along a road curvature (R) of a road (RS), comprising:
obtaining data representing a rearward view with respect to the articulated vehicle combination;
detecting road edges ($RE_L$, $RE_R$) of the road in the image data;
determining a plurality of longitudinal and lateral positions of the respective detected road edges;
calculating road curvature (R) of the road based on the determined lateral and longitudinal positions;
calculating vehicle path curvature (PC) to stay on the road (R); and
reversing the articulated vehicle combination by automatically steering the articulated vehicle combination to follow the calculated vehicle path curvature (PC) in order to follow the road curvature (R);
wherein the road edges are detected by use of an image analysis algorithm which is based on a plurality of predefined types of road edges of a plurality of different road types;
wherein the plurality of different road types comprises at least one of gravel roads, forest roads, and dirt roads;
wherein the lateral and longitudinal positions are further determined by use of a distance measurement calibration algorithm for the obtained image data;
wherein the calibration is done for different surface inclinations; and
wherein a specific inclination calibration is used for the same inclination situation.

2. The method of claim 1, wherein the image analysis algorithm is a neural network algorithm.

3. The method of claim 2, wherein the predefined types of road edges of the plurality of different road types are obtained by use of a neural network training algorithm,
wherein the neural network training algorithm has been trained based on image data of different road types, and
wherein road edges of the different road types have at least initially been manually annotated.

4. The method of claim 1, wherein the distance measurement calibration algorithm comprises registered pixel locations in an image,
wherein the image represents a corresponding view of the rearward view with respect to the articulated vehicle combination, and
wherein the pixel locations are associated with corresponding known lateral and longitudinal distances to objects behind the vehicle combination.

5. The method of claim 1, wherein the distance measurement calibration algorithm comprises one or more registered pixel locations of a look ahead point (L_look_ahead) which is located at a predefined distance (L) in a longitudinal direction behind the vehicle combination, and
wherein the method further comprises:
by use of the obtained image data, determining a value indicative of a lateral displacement (y_lateral, phi_ref) of the look ahead point (L_look_ahead) with respect to the calculated road curvature (R), and
wherein reversing the articulated vehicle combination by automatically steering the articulated vehicle combination to follow the calculated vehicle path curvature (PC) in order to follow the road curvature (R) is further performed by use of the determined value indicative of the lateral displacement.

6. The method of claim 1, wherein reversing the vehicle combination by automatically steering the vehicle combination to follow the calculated vehicle path curvature (PC) in order to follow the road curvature (R) is performed by use of a predefined geometric vehicle model for the articulated vehicle combination,
wherein the geometric vehicle model is based on how geometric variables associated with the articulated vehicle combination relate to each other when the articulated vehicle combination moves in reverse with respect to a curvature radius, and
wherein the geometric variables comprises any one of an articulation angle variable (phi_ref) with respect to the curvature radius and a lateral displacement variable (y_lateral) with respect to the curvature radius.

7. The method of claim 1, wherein the geometric vehicle model comprises any one of the following equations:

$$(L2*cos(phi\_ref)+C)/(sin(phi\_ref))=PR;$$

$$(L\textasciicircum 2+y\_lateral\textasciicircum 2)/(2*y\_lateral)=PR;$$

wherein PR is vehicle path curvature radius, L2 is a rear trailer wheel base length of the vehicle combination, C is a next-to-last-trailer coupling point distance from the next-to-last-trailer rear axle, phi_ref is a trailer articulation angle corresponding to a lateral displacement of the look ahead point with respect to the road curvature (R), L is the predefined distance in the longitudinal direction of the look ahead point behind the vehicle combination, and y_lateral is the lateral displacement of the look ahead point with respect to the road curvature (R).

8. The method of claim 1, wherein reversing the articulated vehicle combination by automatically steering the articulated vehicle combination to follow the calculated vehicle path curvature (PC) in order to follow the road curvature (R) is performed by further obtaining a current articulation angle value indicative of a current articulation angle of the vehicle combination, and controlling the steering of the articulated vehicle combination in response to the current articulation angle value.

9. A control unit for an articulated vehicle combination comprising at least one perception sensor for obtaining image data representing a rearward view of a road (RS), the control unit being configured to:
obtain image data from the at least one perception sensor representing a rearward view with respect to the articulated vehicle combination;
detect road edges of the road in the image data;
determine a plurality of longitudinal and lateral positions of the respective detected road edges;
calculate road curvature (R) of the road based on the determined lateral and longitudinal positions;
calculate vehicle path curvature (PC) to stay on the road (R); and
provide a steering command during reversing of the articulated vehicle combination to follow the calculated vehicle path curvature (PC) in order to follow the road curvature (R);
wherein the road edges are detected by use of an image analysis algorithm which is based on a plurality of predefined types of road edges of a plurality of different road types;
wherein the plurality of different road types comprises at least one of gravel roads, forest roads, and dirt roads;

wherein the lateral and longitudinal positions are further determined by use of a distance measurement calibration algorithm for the obtained image data;
wherein the calibration is done for different surface inclinations; and
wherein a specific inclination calibration is used for the same inclination situation.

10. The control unit of claim 9, wherein the image analysis algorithm is a neural network algorithm.

11. The control unit of claim 10, wherein the predefined types of road edges of the plurality of different road types are obtained by use of a neural network training algorithm,
wherein the neural network training algorithm has been trained based on image data of different road types, and
wherein road edges of the different road types have at least initially been manually annotated.

12. The control unit of claim 9, wherein the distance measurement calibration algorithm comprises registered pixel locations in an image,
wherein the image represents a corresponding view of the rearward view with respect to the articulated vehicle combination, and
wherein the pixel locations are associated with corresponding known lateral and longitudinal distances to objects behind the vehicle combination.

13. The control unit of claim 12, wherein the distance measurement calibration algorithm comprises one or more registered pixel locations of a look ahead point (L_look_ahead) which is located at a predefined distance (L) in a longitudinal direction behind the vehicle combination, wherein the control unit is further configured to:
by use of the obtained image data, determine a value indicative of a lateral displacement (y_lateral, phi_ref) of the look ahead point (L_look_ahead) with respect to the calculated road curvature (R), and
wherein the steering command to follow the vehicle path curvature (PC) in order to follow the calculated road curvature (R) is based on the determined value indicative of the lateral displacement.

14. The control unit of claim 11, wherein the steering command to follow the vehicle path curvature (PC) in order to follow the calculated road curvature (R) is based on a predefined geometric vehicle model for the articulated vehicle combination,
wherein the geometric vehicle model is based on how geometric variables associated with the articulated vehicle combination relate to each other when the articulated vehicle combination moves in reverse with respect to a curvature radius, and
wherein the geometric variables comprises any one of an articulation angle variable (phi_ref) with respect to the curvature radius and a lateral displacement variable (y_lateral) with respect to the curvature radius.

15. The control unit of claim 13, wherein the geometric vehicle model comprises any one of the following equations:

$$(L2*\cos(phi\_ref)+C)/(\sin(phi\_ref))=PR;$$

$$(L^2+y\_lateral^2)/(2*y\_lateral)=PR;$$

wherein PR is vehicle path curvature radius, L2 is a rear trailer wheel base length of the vehicle combination, C is next-to-last-trailer coupling point distance from the next-to-last-trailer rear axle, phi_ref is a trailer articulation angle corresponding to a lateral displacement of the look ahead point with respect to the road curvature (R), L is the predefined distance in the longitudinal direction of the look ahead point behind the vehicle combination, and y_lateral is the lateral displacement of the look ahead point with respect to the road curvature (R).

16. The control unit of claim 11, wherein the provided steering command during reversing of the articulated vehicle combination is based on the control unit being further configured to obtain a current articulation angle value indicative of a current articulation angle of the vehicle combination,
wherein the articulated vehicle combination is steered in response to the current articulation angle value.

17. An articulated vehicle combination comprising at least one perception sensor for obtaining image data representing a rearward view with respect to the articulated vehicle combination and the control unit of claim 9.

18. The articulated vehicle combination of claim 17, further comprising a sensor for obtaining a current articulation angle value indicative of an articulation angle of the vehicle.

* * * * *